June 28, 1932.  C. G. BIRO  1,864,517
BAND SAW MEAT CUTTER CONSTRUCTION
Original Filed April 25, 1929  2 Sheets-Sheet 1

Inventor
Carl G. Biro
By Faust F. Crampton
Attorney

June 28, 1932.  C. G. BIRO  1,864,517
BAND SAW MEAT CUTTER CONSTRUCTION
Original Filed April 25, 1929   2 Sheets-Sheet 2

Inventor
Carl G. Biro
By Faust F. Crampton
Attorney

Patented June 28, 1932

1,864,517

UNITED STATES PATENT OFFICE

CARL G. BIRO, OF MARBLEHEAD, OHIO

BAND-SAW MEAT CUTTER CONSTRUCTION

Original application filed April 25, 1929, Serial No. 357,917, now Patent No. 1,793,461, dated February 24, 1931, and in Canada July 11, 1930. Divided and this application filed January 23, 1931. Serial No. 510,691.

This application is a division of my application Serial No. 357,917, filed on April 25, 1929, for a meat cutter, on which Letters Patent No. 1,793,461 were granted on February 24, 1931.

My invention has for its object to provide a band saw meat cutting machine wherein the band saw may be subjected to a predetermined tension and this tension maintained. In the preferred form of construction, the machine is formed of two frame parts, and means is provided for adjusting one of the frame parts relative to the other in a direction to separate the pulleys on which the band saw is located and securing the frames in their relative positions when the band saw has been subjected to the desired tension. Preferably, a spring of substantially known resistance to deformation is provided and the tenion of the band saw is determined by the extent of deformation of the spring enabling exact adjustment. The frames are then secured in their relative positions which enables uniform operation of machines embodying the invention, either when first installed or when the band saws are substituted or repaired.

The invention may be contained in meat cutters that vary in their details of construction and, to illustrate a practical application of the invention, I have selected a meat cutter having the band-saw cooperative features as an example of the various embodiments of my invention, and shall describe the meat cutters hereinafter. The particular meat cutter selected for purposes of illustration is shown in the accompanying drawings.

Figure 1:
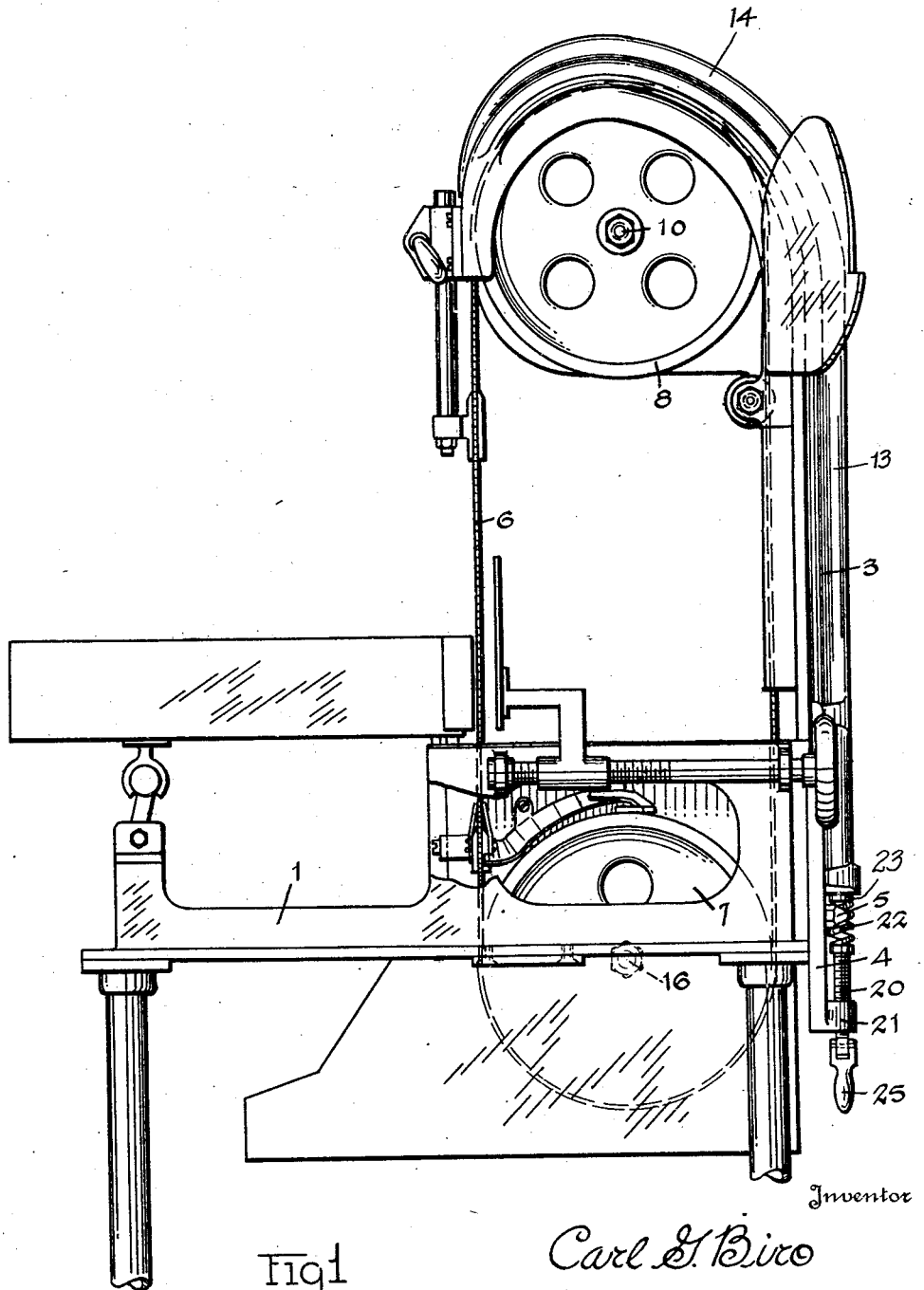
Figure 2:
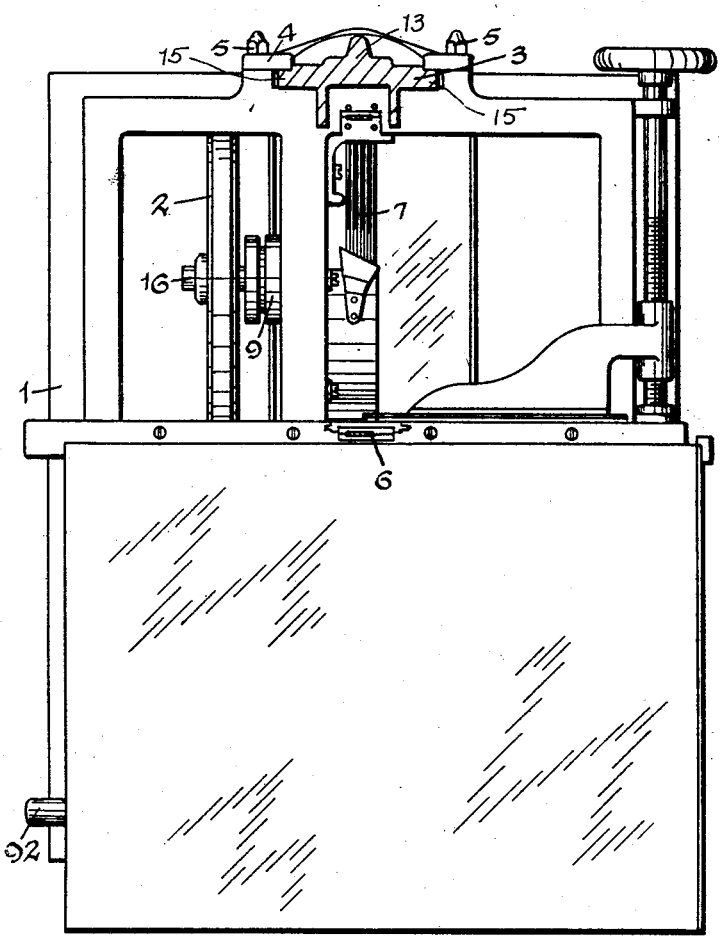
Figure 3:
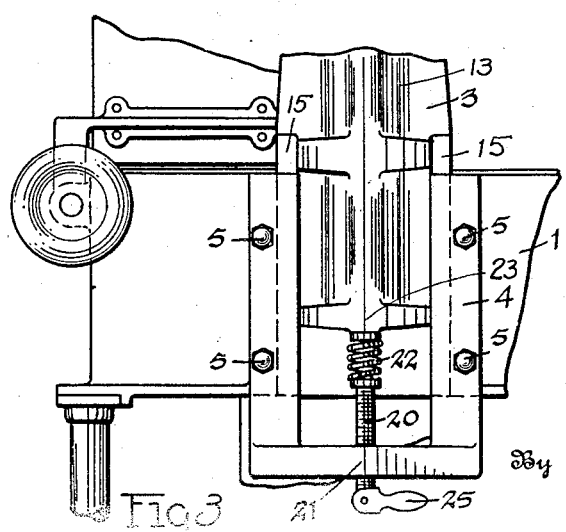

Fig. 1 is a side view of the machine selected as an example of the embodiment of my invention. Fig. 2 is a top view of the table of the band saw cutting machine illustrated in Fig. 1. Fig. 3 is an end view of a part of the machine and illustrates the frame adjusting and saw tension mechanism.

In the form of construction shown in the drawings, the meat cutter is supported on a frame 1. It is driven by a suitable motor operating through the driving wheel 2. A second frame 3 is adjustably connected to the frame 1 by means of the clamping member 4 and the bolts 5. The band-saw 6 passes over the pulleys 7 and 8, one rotatively supported on shaft 16 in the frame 1 by means of the ball bearings 9 and the other supported on the frame 3 by means of the shaft 10.

The frame 3 comprises a standard 13 and a housing 14. The standard 13 extends along one side of the frame 1 upward to support the housing 14 in which is located the pulley wheel 8. It is provided with a pair of guide parts 15 movable within the clamping member 4 which, with the end of the frame 1, forms a way for guiding the frame 3 in its adjusted movements relative to the frame 1. The housing 14 overhangs the frame 1 to locate parts of the band saw in substantially a vertical position. The frame 3 is adjustably located with respect to the frame 1 by means of the screw 20 which is threaded into the lower end 21 of the clamping member. A spring 22 is located intermediate the end of the screw 20 and a boss 23 formed on the lower end of the frame 3. To adjust the frame 3 relative to the frame 1, and consequently the band saw 6, the clamping member 4 is loosened by giving a reverse turn to the screws 5 to release the clamping member 4 relative to the frame 1 in order to permit the frame 3 to slide with respect to the frame 1 and yet maintain the frame 3 in position with respect to the frame 1. The screw 20 is then turned by means of the handle 25 that is connected to the lower end of the screw 20. The screw 20 is rotated until the spring 22 is subjected to the desired compression as determined by the distance between the coils or turns of the spring which may be suitably callipered for exactness as by the insertion of a suitable tool of known dimensions and determining the distance between the turns of the spring 22.

The spring 22 has a substantially known elastic coefficient and resistance to deformation and, consequently, the band saw may be adjusted to a substantially accurate tension as may be determined by the callipering of the spaces between the turns of the spring. Thus, in assembling machines embodying the invention, substantially uniform conditions, with respect to the tension of the band saw, may be produced in the machines. Also, when the band saws are substituted or repaired, reinstalled or inserted in the machine, they may be subjected to the same tension. This produces a uniform cutting operation of the meat and prevents operation of the machine either when the band saw is too loose or too tight and its tension is readily determined and set at its installation and maintained at that tension throughout the operation of the band saw installed.

When the desired tension of the band saw has been produced by the rotation of the screw 20, the frame 3 is secured in position relative to the frame 1 by means of the bolts 5 that clamp the frame 3 against the end of the frame 1 to prevent any return movement of the frame 3 by reason of the tension of the band saw and to prevent the variation in the adjustment by the operation of the screw 20. This insures a constant cutting operation of the machine, the band saw being maintained at a constant tension by reason of the frame 3 being securely clamped to the frame 1.

I claim:

1. In a meat cutter, a frame, a saw band, a pulley wheel rotatably supported on the frame for operating the saw band, a second frame vertically slidable with respect to the first named frame and having a pulley wheel for guiding the saw band, a screw, the first named frame having a nut for receiving the screw, a spring located intermediate the end of the screw and the lower end of the second named frame for adjusting the tension of the saw band, means for clamping the said frames together.

2. In a meat cutter, a frame, a band saw, a pulley wheel rotatably supported on the frame for operating the band saw, a second frame vertically slidable with respect to the first named frame and having a pulley wheel for guiding the band saw, a clamping member for engaging the second named frame, a screw threaded through the lower end of the clamping member, a spring located intermediate the end of the screw and the lower end of the second named frame for adjusting the tension of the band saw, and bolts for clamping the clamping member against the second named frame and clamping the second named frame to the first named frame.

In witness whereof I have hereunto signed my name to this specification.

CARL G. BIRO.